United States Patent

Nam et al.

[11] Patent Number: 5,970,809
[45] Date of Patent: Oct. 26, 1999

[54] TRANSMISSION FOR FARM TRACTORS

[75] Inventors: Yo Sang Nam; Young Sun Kang, both of KyongGi-Do; Gye Yong Song, KyeongSangNam-Do; Sang Il Nam, Seoul; Sam Suk Jung, KyeongSangNam-Do, all of Rep. of Korea

[73] Assignee: Tongyang Moolsan Co., Ltd., Kyeunggi-Do, Rep. of Korea

[21] Appl. No.: 09/089,082

[22] Filed: Jun. 2, 1998

[30] Foreign Application Priority Data

Jun. 3, 1997 [KR] Rep. of Korea .................. 97-22796

[51] Int. Cl.$^6$ ............................................... F16H 37/06
[52] U.S. Cl. .................. 74/15.86; 74/360; 74/665 GA; 74/331; 74/15.4
[58] Field of Search ........................... 74/331, 325, 342, 74/360, 665 R, 665 GA, 606 R, 15.4, 15.8, 15.82, 15.86; 180/53.1, 233, 247

[56] References Cited

U.S. PATENT DOCUMENTS

| | | | |
|---|---|---|---|
| 4,094,206 | 6/1978 | Sogo et al. ........................ | 74/325 X |
| 4,294,131 | 10/1981 | Murayama ........................ | 74/15.4 |
| 4,351,196 | 9/1982 | Yoshida et al. .................... | 74/15.4 |
| 4,462,273 | 7/1984 | Yoshii et al. ..................... | 74/15.86 X |
| 4,628,768 | 12/1986 | Omura et al. ..................... | 74/360 X |
| 4,716,775 | 1/1988 | Horii et al. ...................... | 74/15.86 |
| 4,721,002 | 1/1988 | Horii .............................. | 74/360 X |
| 4,750,580 | 6/1988 | Umemoto ......................... | 74/665 GA X |
| 5,245,892 | 9/1993 | Kim et al. . | |
| 5,465,630 | 11/1995 | Iwamoto ........................... | 74/331 |
| 5,546,823 | 8/1996 | Stine et al. ....................... | 74/331 |
| 5,640,882 | 6/1997 | Mueller ........................... | 74/360 X |

*Primary Examiner*—Dirk Wright
*Assistant Examiner*—Peter T. Kwon
*Attorney, Agent, or Firm*—Colin P. Abrahams

[57] ABSTRACT

A transmission device for farm tractors is disclosed. In the transmission device, a hollow travelling drive shaft and a PTO drive internal shaft are substituted for a typical hollow PTO drive shaft and travelling internal shaft, respectively. The transmission device also has a splined flange for directly transmitting the engine power from the flywheel to the PTO drive internal shaft. In a main change gear unit, a hub sleeve and a main gear shifting shaft are forged into a single structure. A super low-speed change gear unit is connected to a sub-change gear through two sets of shafts capable of allowing the super low-speed change gear unit to be independently operated from the sub-speed change gear unit. The transmission device is thus selectively operated without performing any super low-speed changing action.

3 Claims, 5 Drawing Sheets

TRANSMISSION FOR FARM TRACTORS

BACKGROUND OF THE INVENTION

1. Field of the Invention

The present invention relates, in general, to a transmission device for farm tractors, having a plurality of gear trains in a transmission case and designed for utilizing the engine power as travelling power at a travelling mode or PTO (power Take Off) power at a PTO mode having a small volume and simple construction suitable for the small-sized agricultural tractor.

2. Description of the Prior Art

In typical farm tractors of several tens of horsepower(hp), an engine power leading unit and main and sub-change gear units are coupled to each other from the front to the back of the transmission case, so they selectively utilize the engine power as travelling power at a travelling mode or PTO power at a PTO mode. The main change gear unit has gear trains capable of transmitting the engine power to the wheels of a tractor for forward and reverse travelling. Meanwhile, the sub-change gear unit has both a travelling power output shaft and PTO power transmitting gear trains, thus selectively driving the implements of the tractor when the tractor performs PTO operations. The transmission device, designed for selectively transmitting the travelling power or the PTO power of several tens of horsepower, has to be provided with appropriate units capable of performing the travelling or PTO operation.

For example, a typical transmission device, used in farm tractors of Tongyang TA series of Korea, comprises a plurality of cooperating units: an engine power leading unit, a main change gear unit, a super low-speed change gear unit, a sub-change gear unit, a forward/reverse drive unit, an independent PTO clutch unit, and a front wheel drive unit.

The above Korean transmission device is designed for transmitting the engine power to a hollow drive shaft through a specifically designed and splined clutch, thus allowing the engine power to be transmitted to PTO drive shaft from a main clutch cover part. In the above transmission device, the PTO power is controlled by an independent PTO clutch, while the travelling power is controlled by a main clutch.

The main change gear unit is designed for transmitting the engine power while changing the rotational speed of the power between several gear shifting stages by bringing a plurality of gears of different sizes into selective engagement with each other in accordance with selected speed changing steps.

In the above transmission device, the sub-change gear unit has a dual or triple shaft structure with one shaft commonly performing a super low-speed changing action and a sub-speed changing action. The transmission device also has a mid-PTO power transmitting unit which is set in a transmission case.

The forward/reverse drive unit comprises five gears in addition to a drive gear engaging with a counter gear. The counter gear also engages with a forward drive gear, while a reverse drive gear, mounted on the same shaft as that of the forward drive gear, engages with a reverse drive idle gear. The reverse drive idle gear comes into engagement with the counter gear, thus allowing the forward/reverse drive unit to select a forward or reverse movement of the tractor.

In the independent PTO clutch unit used for selectively transmitting the power of the engine to a PTO drive shaft, a plurality of power transmitting shafts and gears are independently positioned and operated. In the case of a four wheel drive tractor, the engine power is transmitted to the front wheels of the tractor as follows. That is, the engine power is transmitted from a gear, specifically used for driving the front wheels, to a sub-change gear shaft.

Thereafter, the engine power is distributed from the sub-change gear shaft or another shaft so as to drive the four wheels of the tractor at the same time.

However, such a typical transmission device for farm tractors is problematic in that the specifically designed and expensive clutch increases the production cost of the transmission device. The above clutch also lengthens the transmission device, thus causing operational vibrations on the PTO drive shaft and enlarging the volume of the transmission device. Therefore, the transmission device with such a clutch is not suitable for being used with a small-sized tractor. In addition, the main change gear unit has to be provided with complex gear trains, consisting of a plurality of gears having different sizes, so the main change gear unit regrettably has a complex construction and increases the production cost of the transmission device, and deteriorates productivity of the transmission device. Such complex gear trains of the main change gear unit can also confuse a user while repairing the transmission device, thus being inconvenient to the user.

The dual or triple shaft structure of the sub-change gear unit prevents the power transmission device from being small sized or simplified. In addition, the super low-speed change gear unit is integrated with the sub-change gear unit, so it is impossible to selectively operate the transmission device without allowing the engine power to be processed by the super low-speed change gear unit.

The forward/reverse drive unit comprises five gears in addition to the drive gear, thus having a complex construction and increasing the production cost of the transmission device.

In addition, the independent PTO clutch comprises a plurality of power transmitting shafts and gears which are independently positioned and operated. In the above transmission device, the front wheel drive unit is designed for driving the four wheels of a tractor at the same time by transmitting the engine power from the front wheel drive gear to the sub-change gear shaft and distributing the engine power from the sub-change gear shaft or another shaft. Therefore, the front wheel drive unit complicates the construction of the power transmission device and increases the production cost of the transmission device.

SUMMARY OF THE INVENTION

Accordingly, the present invention has been made keeping in mind the above problems occurring in the prior art, and an object of the, present invention is to provide a transmission device for farm tractors, which has a plurality of gear trains in a transmission case and is designed for effectively utilizing the engine power as travelling power at a travelling mode or PTO power at a PTO mode, and has a small volume and simple construction suitable for the small-sized farm tractor.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
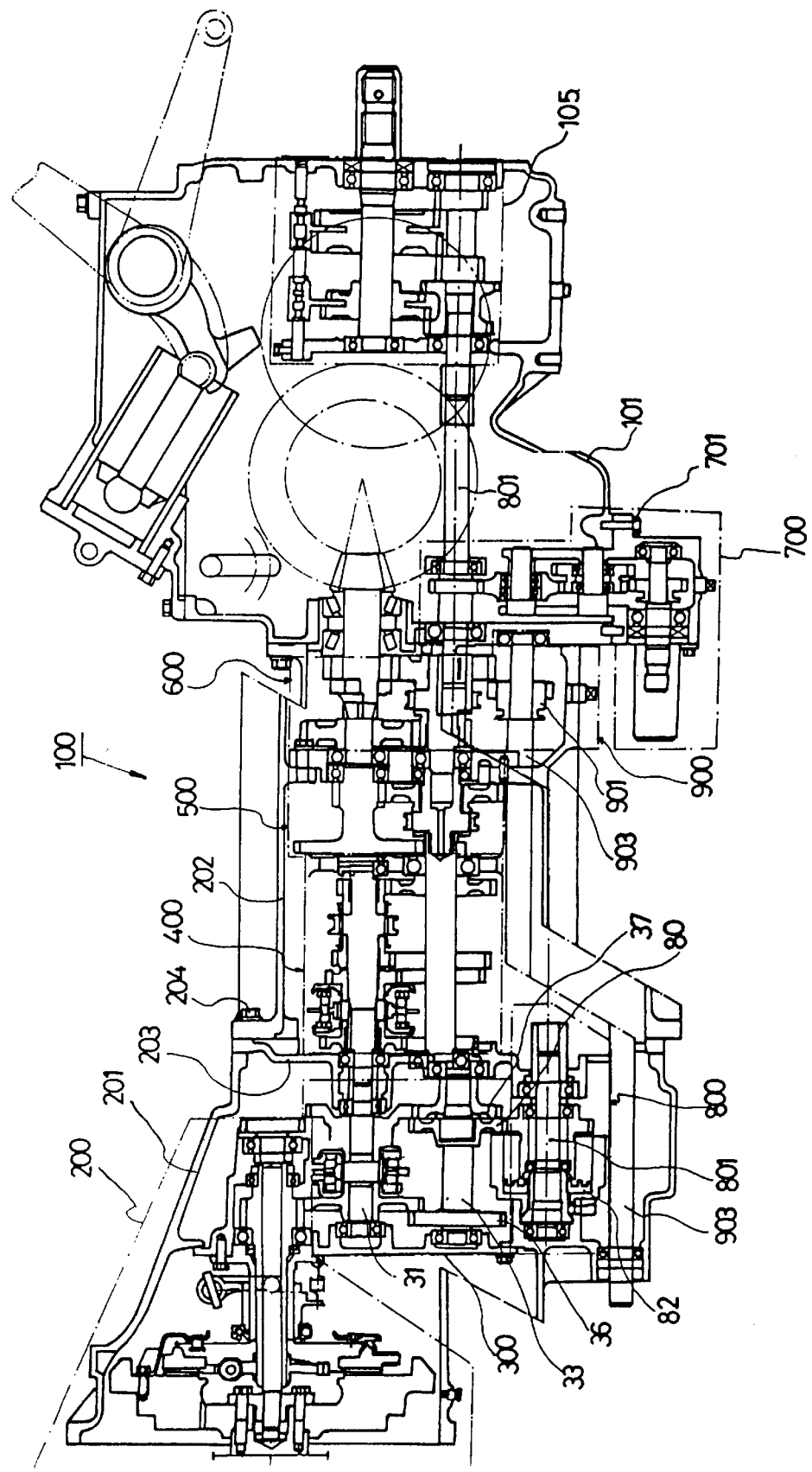
FIG. 1 is a view showing the construction of a transmission device for farm tractors in accordance with the preferred embodiment of the present invention.

FIG. 1 is a view showing the construction of a transmission device for farm tractors in accordance with the preferred embodiment of this invention. As shown in the drawing, the transmission device 100 of this invention comprises a plurality of units: an engine power leading unit 200, a forward/reverse drive unit 300(so called shuttle unit), a main change gear unit 400, a super low-speed change gear unit 500, a sub-change gear unit 600, a mid-PTO unit 700, an independent PTO clutch unit 800, a PTO change gear unit 105, and a front wheel drive unit 900.

The above transmission device 100 also has a shuttle shaft 31 and a spacer 203. The shuttle shaft 31 extends from a clutch housing 201 into a mid-transmission housing 202.

Meanwhile, the spacer 203 is set in the transmission device 100 at the junction between the two housings 201 and 202 and supports the bearings of both a reverse drive counter shaft 33 and a PTO drive shaft 801. The above spacer 203 is detachably mounted to the transmission device 100 by a bolt 204 and is also designed for allowing the wheel base of a tractor to be easily adjustable when necessary.

Figure 2:
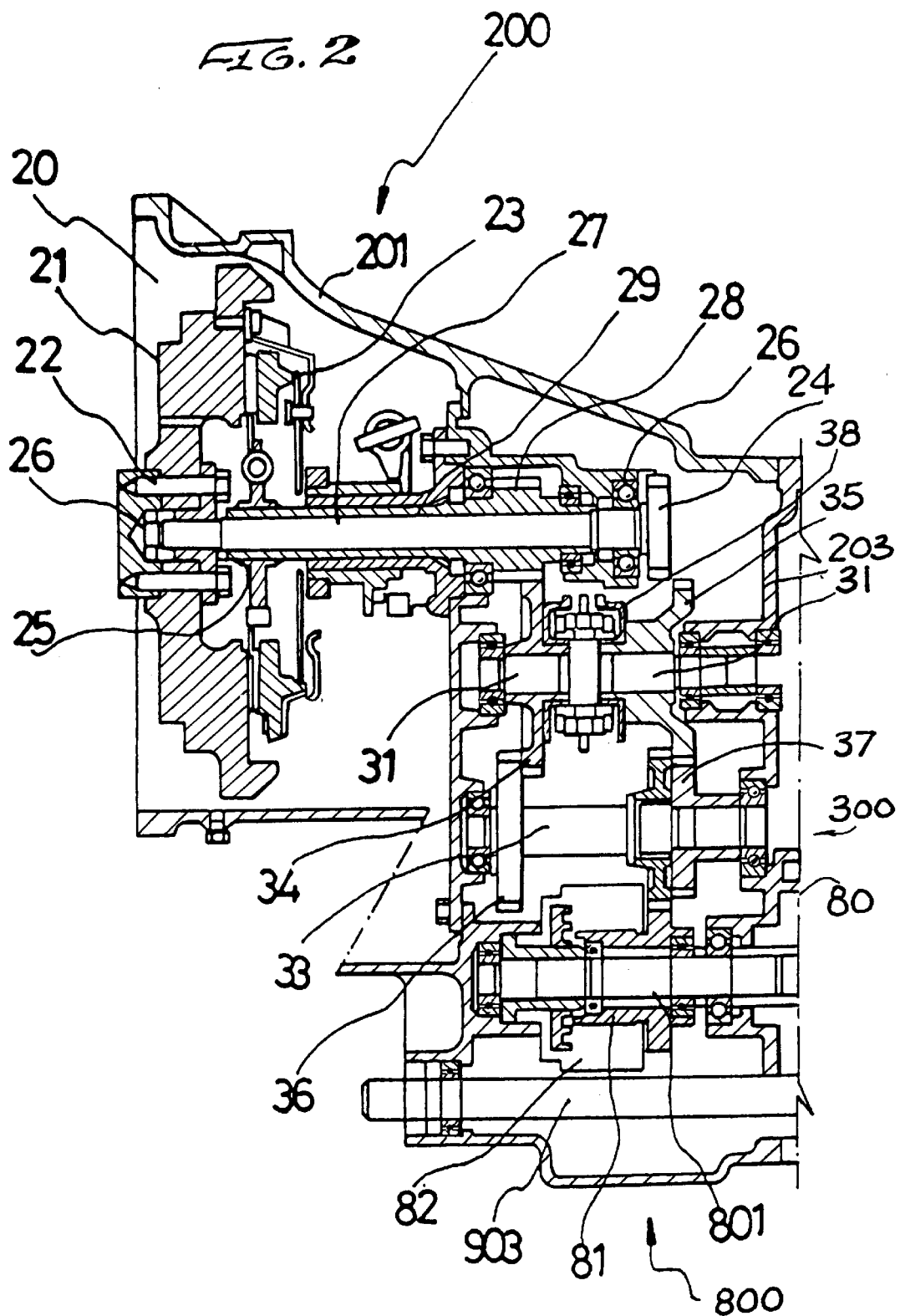
FIG. 2 is a view of the front part, consisting of both an engine power leading unit and a forward/reverse drive unit, of the above transmission device.

FIG. 2 shows the leading part, consisting of both the engine power leading unit 200 and the forward/reverse drive unit 300, of the above transmission device 100. As shown in the drawing, the power leading unit 200 comprises a main clutch part 20, a splined flange 25, a PTO drive internal shaft 27 and a hollow travelling drive shaft 29. The main clutch part 20 comprises a flywheel 21 and a clutch 23 coupled to the hollow travelling drive shaft through a spline coupling, while the splined flange 25 is provided at the central portion of the main clutch part 20. The PTO drive internal shaft 27 is coupled to the splined flange 25 through a spline coupling and has a drive gear 24 at one end thereof. The hollow travelling drive shaft 29 surrounds the PTO drive internal shaft 27 and has an external drive gear 28 at the outside surface of one end thereof. The power leading unit 200 receives the engine power through the PTO drive internal shaft 27 coupled to the splined flange 25.

The splined flange 25 has an internal spline at a position corresponding to the central portion of the main clutch's flywheel 21 and transmits the engine power from the flywheel 21 to the PTO drive internal shaft 27. The PTO drive internal shaft 27, set in the hollow travelling drive shaft 29, has a spline at one end thereof, thus being brought into engagement with the splined flange 25 through a spline coupling. Each end of the PTO drive internal shaft 27 is supported freely rotatably a bearing 26.

The forward/reverse drive unit 300 transmits the engine power from the power leading unit 200 to the main and sub-change gear units 400 and 600. In the above unit 300, both a forward drive gear 34 of the shuttle shaft 31 and a first counter gear 36 of the reverse drive counter shaft 33 commonly engage with the external drive gear 28 of the hollow travelling drive shaft 29. A second counter gear 37 mounted on the same shaft as that of the first counter gear 36, engages with the reverse drive gear 35 of the shuttle shaft 31. Therefore, the forward/reverse drive unit 300 effectively selects a forward or reverse drive mode of the tractor without having any reverse drive idle gear different from a typical unit. In addition, the gear train of the forward/reverse drive unit 300 only consists of four gears 34, 35, 36 and 37 in addition to a drive gear, thus reducing the number of gears and the production cost of the power transmission device 100.

Figure 3:
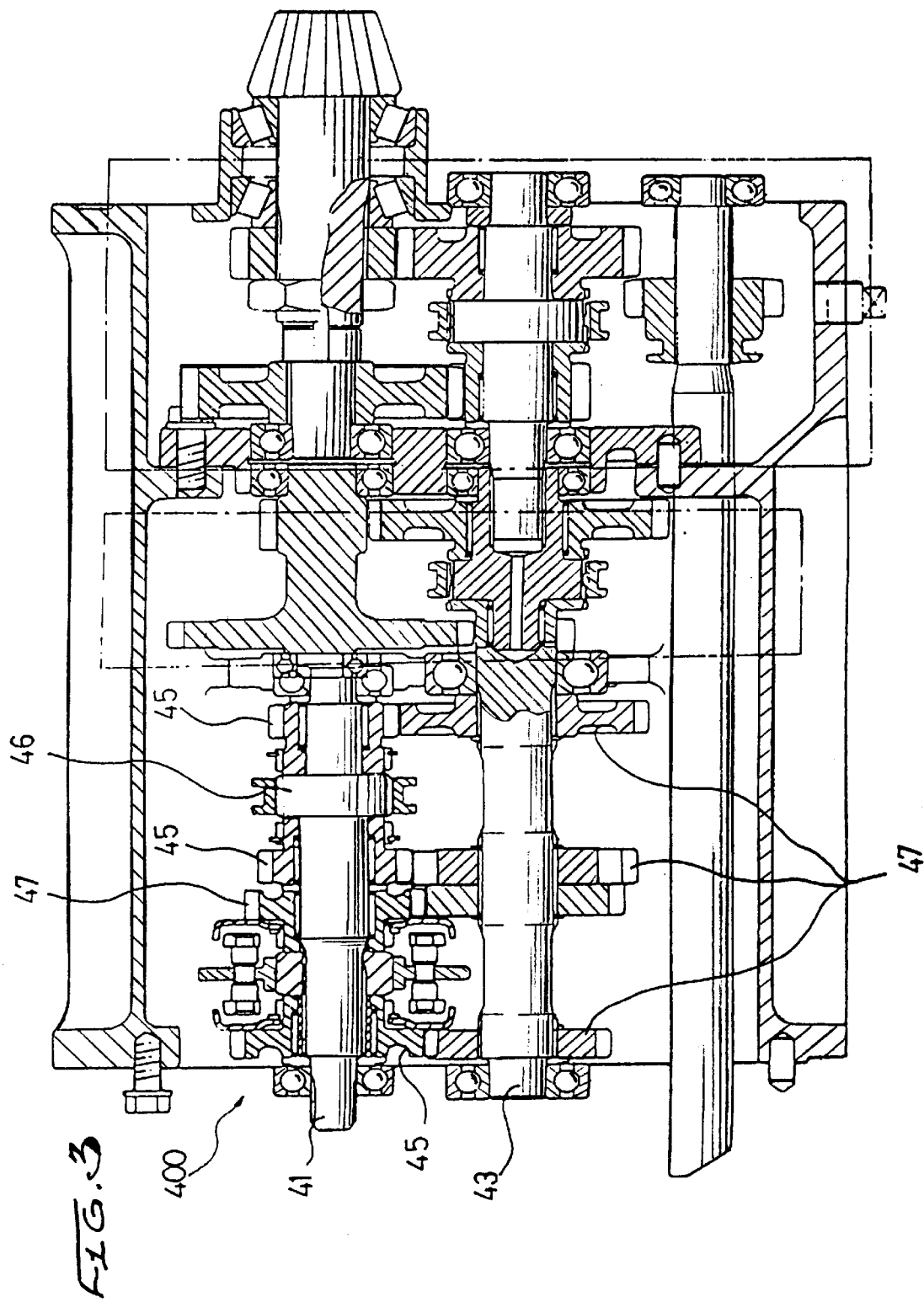
FIG. 3 is a view of a main change gear unit of the above transmission device.

FIG. 3 is a view of the main change gear unit 400 of the above transmission device 100. As shown in the drawing, the main change gear unit 400 receives the engine power from the power leading unit 200 through two shafts: a main gear shifting shaft 41 and a main gear shifting counter shaft 43.

In the above unit 400, the two shafts 41 and 43 individually have a plurality of drive gears 45, 47. The drive gears 45 and 47 of the two shafts 41 and 43 engage with each other, thus allowing the unit 400 to transmit the engine power while appropriately changing the rotational speed of the power. A hub sleeve 46 is formed in one piece on the main gear shifting shaft 41 at a position between the two drive gears 45 of the shaft 41. The above unit 400 allows one to change the travelling speed into four step speeds.

Figure 4:
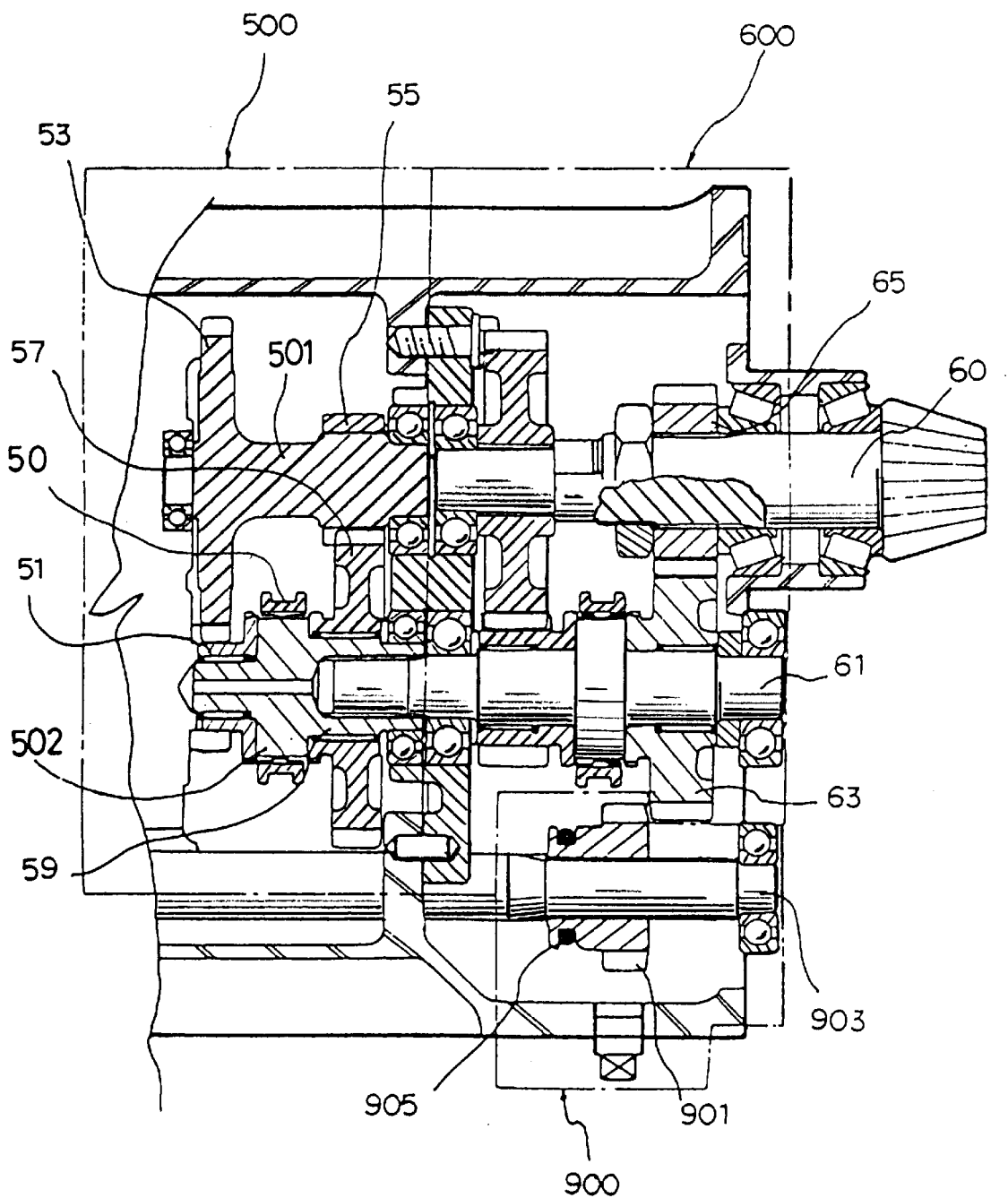
FIG. 4 is a view of a super low-speed change gear unit, a sub-change gear unit, and a front wheel drive unit of the above transmission device.

FIG. 4 shows the construction of the super low-speed change gear unit 500, the sub-change gear unit 600, and the front wheel drive unit 900 of the above transmission device 100.

As shown in the drawing, the super low-speed change gear unit 500 comprises two parallel shafts: first and second shafts 501 and 502. The first and second shafts 501 and 502 individually have a plurality of gears 53 and 55, 51 and 57.

In order to receive the power from the main change gear unit 400, the gears 53 and 55 of the first shaft 501 are brought into engagement with the gears 51 and 57 of the second shaft 502, respectively. The fourth gear 57 of the above unit 500 also engages with a power input shaft 61 of the sub-change gear unit 600 through a spline coupling, thus transmitting the engine power from the main change gear unit 400 to the sub-change gear unit 600.

When it is necessary for the above transmission device 100 to be operated without performing any super low-speed changing action, a sleeve 50 of the first shaft 501 is moved forward by a shifter. In such a case, the first gear 51 of the first shaft 501 directly transmits the engine power from the main change gear unit 400 to the sub-change gear unit 600 through the second shaft 502.

The sub-change gear unit 600 comprises the power input shaft 61, a power input gear 63 and a power output gear 65. The power input shaft 61 engages with the fourth gear 57 of the super low-speed change gear unit 500 through a spline coupling as described above, thus receiving the engine power from the super low-speed change gear unit 500. The power input gear 63 is placed at one end of the power input shaft 61.

Meanwhile, the power output gear 65 engages with the power input gear 63 and is integrated with a pinion shaft 60, thus transmitting the engine power from the power input gear 63 to the pinion shaft 60. The above pinion shaft 60 transmits the engine power to the rear wheels of the tractor, thus allowing the tractor to be travelled.

The front wheel drive unit 900 is coupled to the sub-change gear unit 600 by a front wheel drive gear 901, which is connected to a front wheel drive shaft 903 and directly engages with the power input gear 63 of the sub-change gear unit 600. A shifter 905 is coupled to a side of the front wheel drive gear 901, so the drive gear 901 is movable to the front or back by the shifter 905 while transmitting the engine power from the sub-change gear unit 600 to the front wheel drive shaft 903.

The construction of the independent PTO clutch unit 800 is shown in FIG. 2. As shown in the drawing, a PTO gear 80 is mounted on the reverse drive counter shaft 33 interconnecting the two counter gears 36 and 37 of the forward/reverse drive unit 300 and engages with the drive gear 24 of the PTO drive internal shaft 27, thus transmitting the engine power to a PTO clutch gear 81 of the PTO drive shaft 801. The above PTO clutch gear 81 has a clutch 82 which controls the power transmitting action for the PTO drive shaft 801.

Figure 5:
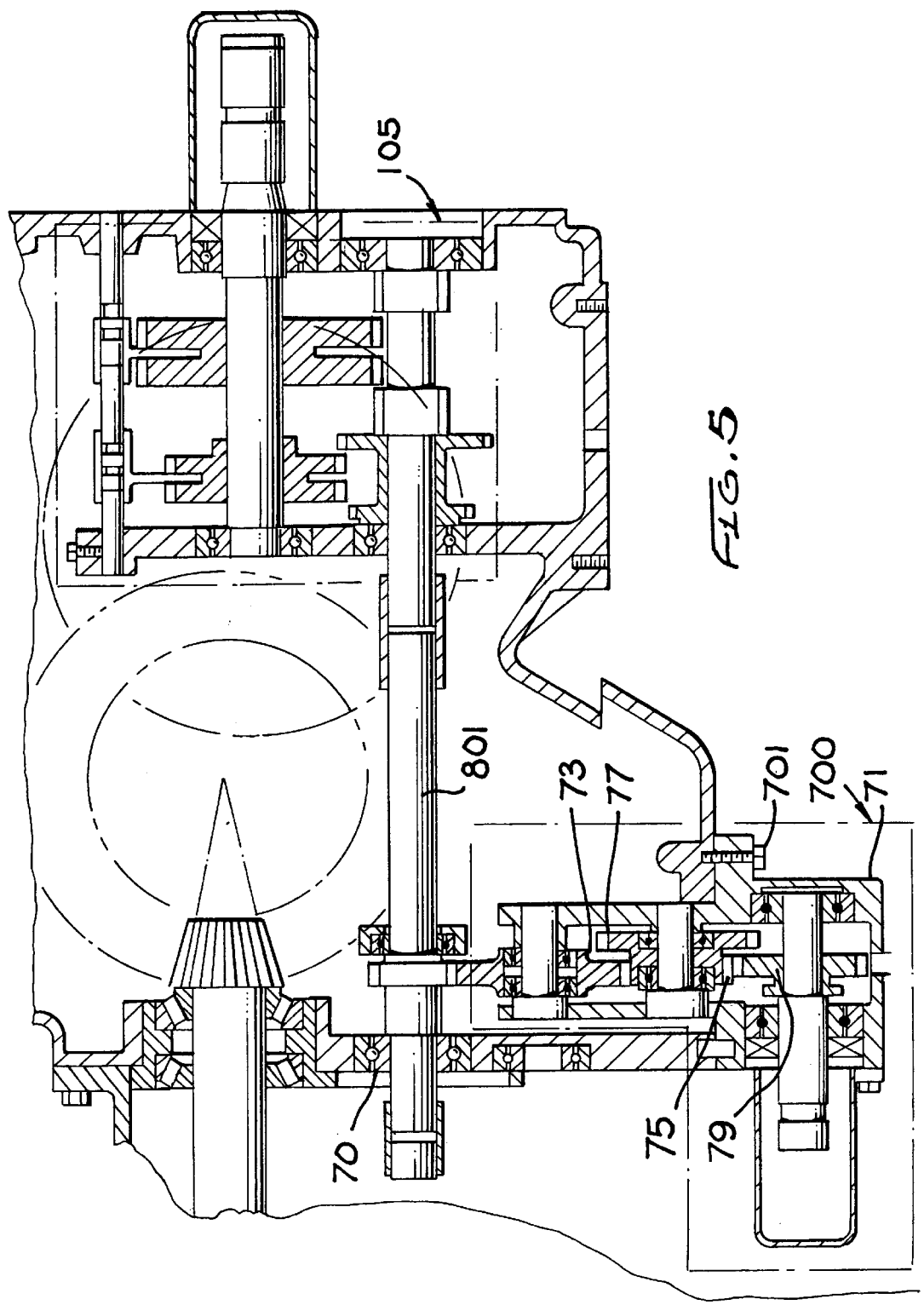
FIG. 5 is a view of a mid-PTO unit and a PTO change gear unit of the above transmission device.

FIG. 5 is a view of the mid-PTO unit 700 and the PTO change gear unit 105 of the above transmission device 100. As shown in the drawing, the mid-PTO unit 700 comprises a mid-PTO drive gear 70, a housing 71 and a plurality of mid-PTO drive gears 73, 75, 77 and 79. The mid-PTO drive gear 70 is formed at the PTO drive shaft 801 of the independent PTO clutch unit 800. The housing 71 is separately provided at the outside of the transmission case 101 and is exteriorly assembled with the case 101. The mid-PTO driven gears 73, 75, 77 and 79 are arranged in the above housing 71 and engage with each other, thus forming a gear train. Of the above driven gears 73, 75, 77 and 79, the first gear 73 engages with the mid-PTO drive gear 70, so the engine power from the drive gear 70 is transmitted to the fourth gear 79.

The above mid-PTO unit 700 is detachably attached to the outside of the transmission case 101 using a locking member 701 such as a screw, so it is possible to separate the unit 700 from the case 101 when necessary.

Return to FIG. 2, when the sleeve 38, located on the shuttle shaft 31 of the forward/reverse drive unit 300, is moved forward by the shifter, the forward drive gear 34 of the shuttle shaft 31 is brought into engagement with the drive gear 28 of the power leading unit 200. In such a case, the power transmission device 100 performs a forward drive mode.

Meanwhile, when the sleeve 38 is moved backward by the shifter, the counter gear 36 of the reverse drive counter shaft 33 of the forward/reverse drive unit 300 is brought into engagement with the drive gear 28 of the power leading unit 200. In such a case, the power transmission device 100 transmits the engine power to the reverse drive gear 35 of the power leading unit 200 through the reverse drive counter gear 37, thus performing a reverse drive mode.

In the transmission device 100 according to the present invention, the hollow travelling drive shaft 29 and the PTO drive internal shaft 27 are substituted for the typical hollow PTO drive shaft and the typical travelling internal shaft, respectively. The transmission device 100 also has the splined flange 25 which directly transmits the engine power from the flywheel 21 to the PTO drive internal shaft 27.

The transmission device 100 further includes the independent PTO clutch unit 800 which selectively transmits the engine power as PTO power. In addition, the external drive gear 28, which is provided at the hollow travelling drive shaft 29, is controlled by a generally designed clutch 23 in place of a specifically designed and expensive clutch used in a typical transmission device. Such a generally designed clutch 23 reduces the production cost of the transmission device and shortens the length of the transmission device, thus allowing the device to be small-sized. Such a small-sized transmission device is preferably used with a small-sized tractor.

The bearings 26, which support both ends of the PTO drive internal shaft 27, effectively reduce operational vibrations of the shaft 27.

In the main change gear unit 400, the hub sleeve 46 and the main gear shifting shaft 41 are forged into a single structure, so it is possible to reduce the number of parts of the main change gear unit 400 and simplify the construction of the unit 400.

In the transmission device 100, the super low-speed change gear unit 500 is connected to the sub-change gear unit 600 through two sets of shafts which are designed for allowing the super low-speed change gear unit 500 to be independently operated from the sub-speed change gear unit 600. That is, the two units 500 and 600 are designed for independently performing their actions. Due to such a dual shaft structure of the two units 500 and 600, the construction of the transmission device 100 of this invention is more simplified than that of a typical transmission device having a triple shaft structure.

Such a dual shaft structure of the two units 500 and 600 also allows the transmission device 100 to be selectively operated without performing any super low-speed changing action. That is, when the sleeve 50 of the first shaft 501 of the super low-speed change gear unit 500 is moved forward by a shifter, the first gear 51 provided on the first shaft 501 of the unit 500 directly transmits the engine power from the main change gear unit 400 to the sub-change gear unit 600, thus allowing the engine power to be transmitted without being processed by the super low-speed change gear unit 500.

In the independent PTO clutch unit 800, the PTO gear 80 is mounted on the reverse drive counter shaft 33 of the forward/reverse drive unit 300, so it is not necessary to have an additional shaft for the PTO gear 80 in order to drive the PTO clutch unit 800. Therefore, the above unit 800 is small-sized and simplified.

In the front wheel drive unit 900, the front wheel drive gear 901 is designed for selectively engaging with the power input gear 63 of the sub-change gear unit 600. It is thus possible to reduce the number of parts and production cost of the front wheel drive unit 900.

In a brief description, the transmission device for farm tractors according to this invention has a plurality of gear trains in a transmission case. The gear trains are designed for effectively and selectively transmitting the engine power as travelling power at a travelling mode or PTO power at a PTO mode and allow the transmission device to have a small volume and simple construction suitable for being used with small-sized farm tractors.

Another advantage of the transmission device of this invention resides in that the device is convenient to a user since it is easy for the user to handle and maintain the device. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A transmission device for farm tractors, comprising:
    an engine power leading unit comprising:
        a main clutch part consisting of a flywheel and a clutch coupled to a hollow travelling drive shaft through a spline coupling;

a splined flange coupled to a PTO drive internal shaft through a spline coupling;

said PTO drive internal shaft fitted into said splined flange and having a drive gear at one end thereof, said PTO drive internal shaft receiving engine power from the flywheel through the splined flange;

said hollow travelling drive shaft surrounding said PTO drive internal shaft and integrated with an external drive gear;

a forward/reverse drive unit connected to said engine power leading unit, said forward/reverse drive unit comprising:

a shuttle shaft having forward and reverse drive gears, said forward drive gear engaging with the external drive gear of said hollow travelling drive shaft of the engine power transmitting unit;

a reverse drive counter shaft having first and second counter gears commonly mounted to one shaft, said first and second counter gears engaging with said external drive gear of the hollow travelling drive shaft and the reverse drive gear of the shuttle shaft, respectively;

a main change gear unit comprising:

a main gear shifting shaft coupled to said shuttle shaft of the forward/reverse drive unit and having first drive gears;

a main gear shifting counter shaft having second drive gears, said second drive gears engaging with the first drive gear of the main gear shifting shaft, thus allowing the main gear shifting counter shaft to cooperate with the main gear shifting shaft so as to receive the engine power from said forward/reverse drive unit; and a hub sleeve integrally formed on said main gear shifting shaft at a position between the drive gears, thus allowing the main change gear unit to perform a speed changing action between four gear shifting stages;

a superlow-speed change gear unit comprising:

a first shaft having first and second gears; and a second shaft in parallel to said first shaft and having third and fourth gears, said third and fourth gears engaging with the first and second gears of the first shaft respectively, thus receiving the engine power from the main change gear unit;

a sub-change gear unit comprising:

a power input shaft engaging with the fourth gear of the super low-speed change gear unit through a spline coupling, thus receiving the engine power from the second shaft of the super low-speed change gear unit;

a power input gear formed at one end of said power input shaft; and a power output gear engaging with said power input gear and integrated with a pinion shaft, thus transmitting the engine power from the power input gear to rear wheels of a tractor through the pinion shaft;

a front wheel drive unit comprising:

a front wheel drive shaft connected to the power input gear of said sub-change gear unit through a front wheel drive gear; and a shifter coupled to a side of said front wheel drive gear, thus selectively moving the front wheel drive gear to the front or back so as to transmit the engine power from the sub-change gear unit to the front wheel drive shaft;

an independent PTO clutch unit comprising:

a PTO gear provided at a side of the reverse drive counter shaft interconnecting the two counter gears of the forward/reverse drive unit, said PTO gear engaging with said drive gear of the PTO drive internal shaft, thus transmitting the engine power from the PTO drive internal shaft to a PTO clutch gear of a PTO drive shaft, said PTO clutch gear having a clutch for controlling a PTO power transmitting action for the PTO drive shaft; and a mid-PTO unit comprising:

a mid-PTO drive gear provided at said PTO drive shaft of the independent PTO clutch unit;

a housing exteriorly assembled with a transmission case; and a plurality of mid-PTO driven gears arranged in said housing and engaging with the mid-PTO drive gear.

2. The power transmission device according to claim 1, wherein each end of said PTO drive internal shaft is rotatably supported by a bearing, thus preventing the PTO drive internal shaft from operational vibrations.

3. The power transmission device according to claim 1, wherein said mid-PTO unit is exteriorly and detachably mounted to the transmission case using a locking member.

* * * * *